United States Patent
Mohra et al.

(10) Patent No.: US 10,410,525 B2
(45) Date of Patent: Sep. 10, 2019

(54) TECHNIQUE FOR MONITORING A BLIND SPOT ZONE

(71) Applicant: MAN Truck & Bus AG, München (DE)

(72) Inventors: Holger Mohra, München (DE); Claus Arnold, Sinzing (DE); Johannes Guellich, Markt Indersdorf (DE)

(73) Assignee: MAN TRUCK & BUS AG, Munich (DE)

( * ) Notice: Subject to any disclaimer, the term of this patent is extended or adjusted under 35 U.S.C. 154(b) by 0 days.

(21) Appl. No.: 15/910,871

(22) Filed: Mar. 2, 2018

(65) Prior Publication Data

US 2018/0261099 A1    Sep. 13, 2018

(30) Foreign Application Priority Data

Mar. 8, 2017    (DE) .................... 10 2017 002 221

(51) Int. Cl.
*G08G 1/16* (2006.01)
*B60Q 1/38* (2006.01)
*B60Q 9/00* (2006.01)

(52) U.S. Cl.
CPC .............. *G08G 1/167* (2013.01); *B60Q 1/38* (2013.01); *B60Q 9/008* (2013.01)

(58) Field of Classification Search
CPC ........ G08G 1/167; G08G 1/0962; B60Q 1/38; B60Q 9/008; B60Q 1/34; B60Q 1/346; B60W 50/14
USPC .......................... 340/435, 463, 465, 475, 476
See application file for complete search history.

(56) References Cited

U.S. PATENT DOCUMENTS

| | | | |
|---|---|---|---|
| 5,517,196 A * | 5/1996 | Pakett | G01S 13/52 342/70 |
| 5,714,927 A * | 2/1998 | Henderson | G01S 13/931 340/435 |
| 5,872,508 A | 2/1999 | Taoka | |

(Continued)

FOREIGN PATENT DOCUMENTS

DE    102004029860 A1    12/2005
DE    102005054972 A1    5/2007

(Continued)

OTHER PUBLICATIONS

German Office Action issued in corresponding German application No. 102017002221.6 dated Sep. 11, 2017, 9 pages.

(Continued)

*Primary Examiner* — Adnan Aziz
(74) *Attorney, Agent, or Firm* — Weber Rosselli & Cannon LLP

(57) ABSTRACT

A technique for monitoring a blind spot zone of a motor vehicle is described. According to one aspect, a device comprises at least one sensor or an interface of the at least one sensor, which is designed for detecting objects in the blind spot zone of the motor vehicle; an actuating unit which is designed for setting a turn-signal lamp; and a signal transmitter which is designed for outputting, in the motor vehicle, a first signal for confirming the set turn-signal lamp, and outputting a second signal, which differs from the first signal, from the same signal medium as the first signal, if the at least one sensor detects an object in the blind spot zone of the motor vehicle.

14 Claims, 5 Drawing Sheets

(56) References Cited

U.S. PATENT DOCUMENTS

| | | | | |
|---|---|---|---|---|
| 6,838,981 B2* | 1/2005 | Zoratti | B60Q 9/008 340/435 |
| 7,038,577 B2* | 5/2006 | Pawlicki | B60W 30/18 340/435 |
| 7,349,144 B2* | 3/2008 | Varaprasad | B32B 17/06 180/167 |
| 7,720,580 B2* | 5/2010 | Higgins-Luthman | B60R 1/00 701/28 |
| 8,058,977 B2* | 11/2011 | Lynam | B60R 1/1207 340/425.5 |
| 9,616,809 B1* | 4/2017 | Alasry | B60W 50/14 |
| 2003/0141965 A1 | 7/2003 | Gunderson et al. | |
| 2004/0046647 A1 | 3/2004 | Reeves et al. | |
| 2004/0090318 A1* | 5/2004 | Rothkop | B60Q 9/008 340/435 |
| 2005/0168331 A1 | 8/2005 | Gunderson | |
| 2007/0126565 A1* | 6/2007 | Hahn | B60W 50/14 340/435 |
| 2008/0291000 A1* | 11/2008 | Kim | B60Q 9/008 340/436 |
| 2008/0309515 A1* | 12/2008 | la Tendresse | B60Q 9/008 340/901 |
| 2009/0243822 A1* | 10/2009 | Hinninger | B60Q 9/008 340/435 |
| 2010/0073152 A1* | 3/2010 | Nagamine | B60W 50/08 340/425.5 |
| 2012/0081233 A1* | 4/2012 | Niel | G08G 1/167 340/904 |
| 2014/0218213 A1* | 8/2014 | Schneider | G08G 1/167 340/905 |
| 2015/0154869 A1* | 6/2015 | Lee | B60Q 9/008 340/901 |
| 2016/0016508 A1* | 1/2016 | Hoskins | B60Q 1/40 340/476 |
| 2016/0078768 A1* | 3/2016 | Huizen | G08G 1/167 340/435 |
| 2016/0252610 A1* | 9/2016 | Smith | G01S 13/931 342/27 |
| 2016/0297356 A1* | 10/2016 | Dellock | B60Q 1/2665 |
| 2017/0092134 A1* | 3/2017 | Kendall | B60R 1/06 |
| 2017/0267173 A1* | 9/2017 | Goo | B60K 35/00 |
| 2017/0363728 A1* | 12/2017 | Prasad | G01S 13/04 |

FOREIGN PATENT DOCUMENTS

| | | | | |
|---|---|---|---|---|
| DE | 102007027529 B3 | 1/2009 | | |
| EP | 2106968 A2 | 10/2009 | | |
| EP | 2138351 A1 | 12/2009 | | |
| EP | 2899083 A2 * | 7/2015 | | B60W 50/14 |
| EP | 2899083 A2 | 7/2015 | | |

OTHER PUBLICATIONS

European Search Report issued in corresponding EP application No. 18157332.0 dated Jul. 6, 2018, 2 pages.

* cited by examiner

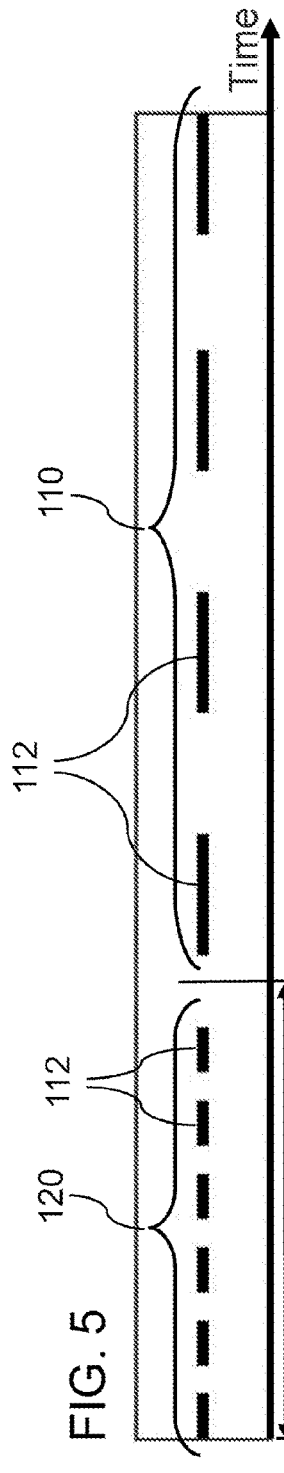
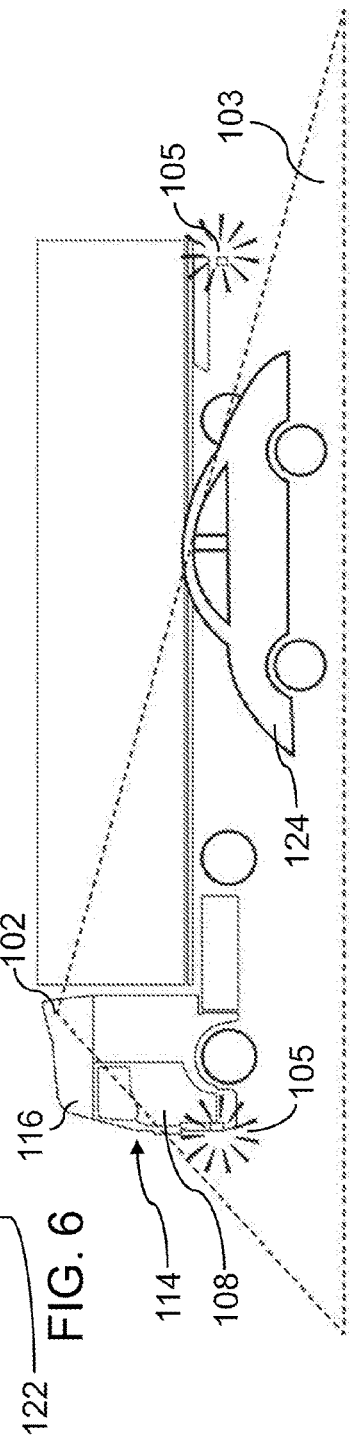
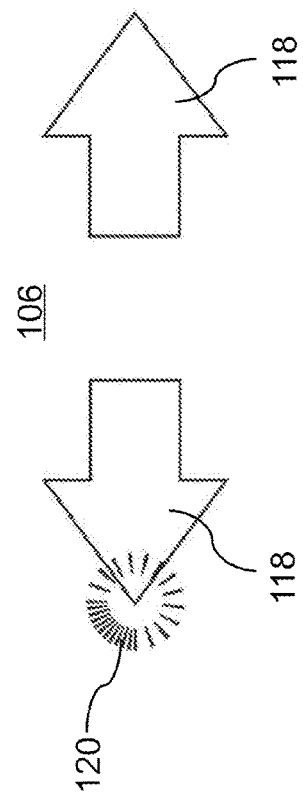

110

120

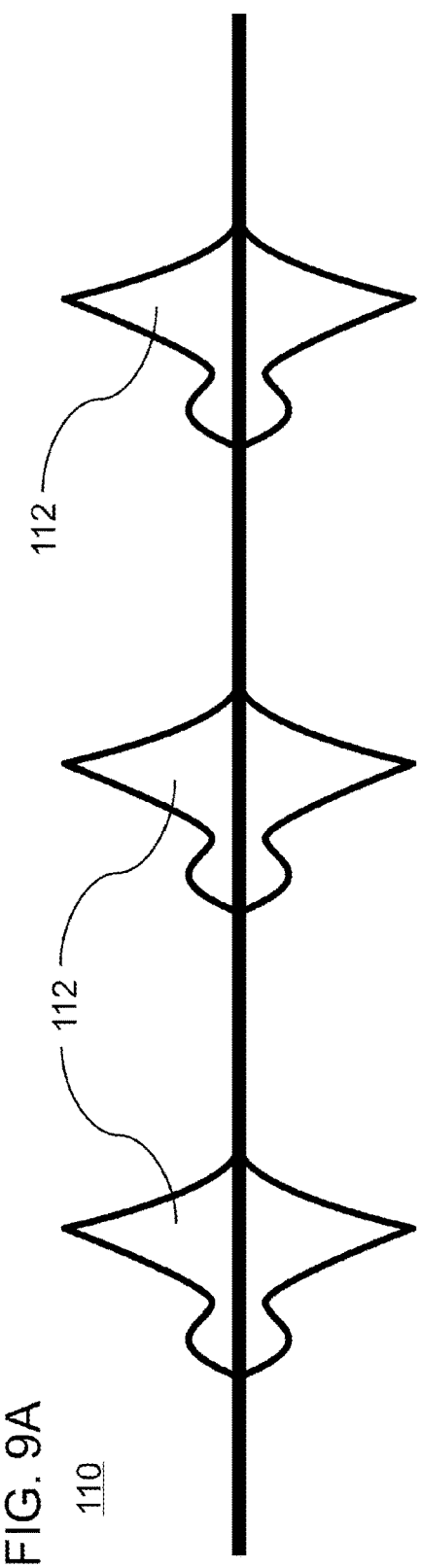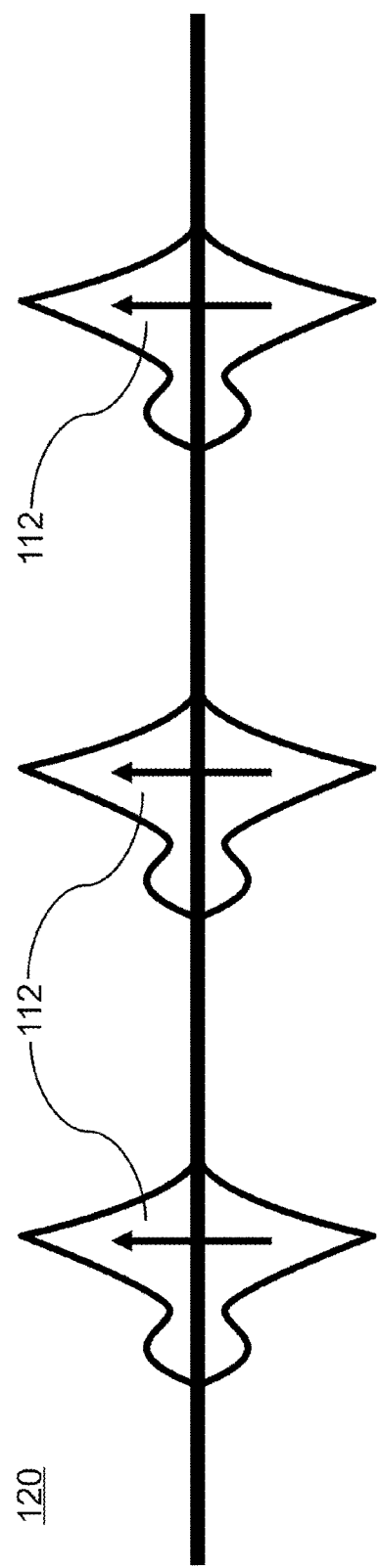
FIG. 9A
110
FIG. 9B
120

TECHNIQUE FOR MONITORING A BLIND SPOT ZONE

BACKGROUND

The present disclosure relates to the monitoring of a blind spot zone of a motor vehicle. In particular, a device for signaling an object in the blind spot zone of a motor vehicle and a motor vehicle equipped therewith are described.

Motor vehicle drivers, in particular drivers of commercial vehicles, are influenced during travel by many different stimulants in the surroundings of the vehicle (for example a construction site or a stop), which the driver must monitor and to which the driver must respond in the event of danger. In addition, a driver of a commercial vehicle must pay attention to numerous internal messages (for example, error messages or assistance systems) and external messages (for example, dynamic traffic signs, special signals from emergency vehicles or telephone calls), and, thus, there is a risk of not hearing or of mistaking some of these signals.

This risk is particularly serious during a lane change on multiple-lane roads, since other vehicles can be located in the blind spot zone of the motor vehicle or can rapidly approach and, thus, be overlooked. In order to minimize this source of danger, a lane-change assistance system (also referred to as a "blind spot assistance system") is utilized in many passenger vehicles and trucks; this system outputs warnings about other vehicles in the blind spot zone.

Document DE 10 2005 054 972 A1 describes a driver assistance system for blind zone monitoring. In order to reduce the number of driver warnings, a check is carried out before a driver warning is output, in order to determine whether a lane change can be carried out on the basis of the given traffic infrastructure. Driver warnings are suppressed if the result of the check is that a lane change is not possible.

This assistance can indeed reduce the risk of accident, but only when the corresponding warning signal is correctly interpreted by the driver and is not mistaken, is indeed heard, or is not ignored. The conventional warning signal is an arbitrary acoustic signal, however, in the case of which this source of error is not ruled out, due to the numerous other internal and external messages which surround the driver.

SUMMARY

One problem addressed by the present disclosure is therefore that of providing a technique for monitoring a blind spot zone, the warning signal of which can be unambiguously assigned to a danger in the blind spot zone. Yet another or alternative problem is that of preventing the warning signal from not being heard and itself serving as a source of danger.

This problem or these problems is/are solved by a device or a vehicle having the features of the independent claims. Advantageous embodiments and applications of the present disclosure are the subject matter of the dependent claims and are described in greater detail in the description, which follows, with a partial reference to the figures.

According to one aspect, a device for monitoring a blind spot zone of a motor vehicle comprises at least one sensor or an interface of the at least one sensor, which is designed for detecting objects in the blind spot zone of the motor vehicle; an actuating unit which is designed for setting a turn-signal lamp; a signal transmitter which is designed for outputting, in the motor vehicle, a first signal for confirming the set turn-signal lamp, and outputting a second signal, which differs from the first signal, from the same signal medium as the first signal, if the at least one sensor detects an object in the blind spot zone of the motor vehicle.

The second signal can also be referred to as a warning signal. Given that the second signal for warning the driver is output by the same signal transmitter by means of the same signal medium that also outputs the confirmation of the set turn-signal lamp, the correlation between an intended lane change and the warning about an object in the blind spot zone is unambiguously signaled to the driver of the motor vehicle, i.e., a recognizable correlation is given. The blind spot zone can also be referred to as a warning zone or a danger zone.

For example, the signal transmitter comprises at least one midrange loudspeaker for generating the first signal and at least one high-pitch loudspeaker for generating the second signal.

The output of the first signal and the second signal "in the motor vehicle" can be implemented by way of an output within a vehicle cab (for example, within a driver's cab) of the motor vehicle.

The correlation can be signaled by one or multiple matching properties of the first signal and the second signal. For example, the first signal and the second signal can include matching sound elements and/or visual elements, or a location of the signal output and/or a signal source of the first signal and the second signal can match.

Alternatively or additionally, the second signal can include a more rapid and/or more intensive (for example, louder or brighter) playback or repetition of the first signal.

The at least one sensor can be designed for detecting road users. The object can be a pedestrian, a bicyclist, and/or another motor vehicle.

The term "blind spot zone" can include those areas which abut one another behind the motor vehicle or on the side of the motor vehicle (and which may not be visible in the rearview mirror of the motor vehicle). For example, the blind spot zone can include a roadway area abutting the right side of the motor vehicle. Alternatively or additionally, the term "blind spot zone" can include areas which are further away or are spaced apart from the motor vehicle (for example, behind the motor vehicle or on the side of the motor vehicle). In this case, for example, objects which are rapidly approaching from behind or from the side (which are still located, for example, behind the motor vehicle, for example at a distance of 30 meters to 40 meters from the motor vehicle) can be detected in the blind spot zone by means of one of the sensors.

The signal transmitter can furthermore be designed for continuously outputting either the first signal or the second signal when the turn-signal lamp has been set.

The turn-signal lamp can be set in the event of a lane change. The turn-signal lamp can be set manually by means of the actuating unit and/or by the motor vehicle (for example, by the device) in response to the determination of a lane change. The motor vehicle (for example, the device) can be designed for determining a change of lanes (which is intended or is already underway), for example by detecting a steering movement (in particular a steering angle) and/or road course (in particular by detecting road markings).

The term "lane change" can include a change between adjacent lanes carried out by the motor vehicle, a turn carried out by the motor vehicle (for example at an intersection, a roundabout, or an entrance), and/or maneuvering (for example on a parking lot) carried out by the motor vehicle.

The at least one sensor can be designed for detecting a spacing from, orientation and/or speed of the object (for example, with respect to the motor vehicle). The at least one sensor can include one or multiple radar sensors. Alternatively or additionally, the detection of surrounding areas (in particular of the blind spot zone) of the motor vehicle, the objects, and/or a traffic infrastructure (in particular of the road markings), can utilize LiDAR sensors (for "Light Detection And Ranging"), ultrasonic sensors, and/or image sensors. To this end, the device can further include one or multiple rear and/or front cameras or can be engaged in signal exchange, or can be brought into signal exchange with such cameras situated on the outer panel of the motor vehicle.

At least one of the sensors can be situated on the motor vehicle. Alternatively or additionally, at least one of the sensors can be situated on a trailer or semitrailer. The sensor interface can include a trailer socket.

The signal transmitter can be further designed for outputting the first signal and the second signal at the same point within the motor vehicle.

The first signal and the second signal can each be acoustic signals. That means, the shared signal medium can include sound in the motor vehicle.

The first signal and the second signal can include a signal sequence having a shared basic signal. Both the first signal and the second signal can include an audio signal and/or a visual signal within the motor vehicle. For the audio signal, the basic signal can be a sound (which has been recorded or synthesized, for example) or a sound pattern. Alternatively or additionally, the basic signal can include a graphical icon for the visual signal. The graphical icon can be generated by a backlit screen or a pixel-based display.

The first signal and the second signal can include repetitions of the basic signal. The repetition of the basic signal can have a greater periodicity in the first signal than the repetition of the basic signal in the second signal.

The basic signal can include an audio signal. The audio signal can be shifted or scaled to a higher frequency in the second signal relative to the audio signal in the first signal. Alternatively or in combination, the basic signal can include a visual signal. The visual signal can be shifted toward a longer wavelength in the second signal relative to the visual signal in the first signal.

The signal transmitter can be designed for outputting the first signal when the turn-signal lamp has been set and an object has not been detected in the blind spot zone. Alternatively or additionally, the signal transmitter can be designed for outputting the second signal, in the event that the object has been detected, when a lane change by the motor vehicle has been determined. The lane change can be determined on the basis of the set turn-signal lamp, a steering angle of the motor vehicle, a change in the steering angle, and/or a position of the motor vehicle relative to road markings (which have been optically detected, for example). For example, the second signal can be output independently of whether the turn-signal lamp has been set.

The lane change can be determined on the basis of an approach by the motor vehicle toward a line of the road marking, an angle between the speed direction of the motor vehicle and the road marking, or a crossing-over of the road marking. The motor vehicle can include a front camera and graphics processors which are designed for detecting the road markings.

If an object is detected in the blind spot zone, the second signal can be output for as long as the object is detected. As soon as the object is no longer detected, the output of the second signal can end. Alternatively or additionally, the signal transmitter can be designed for outputting the second signal in alternation with the first signal while an object is detected, for example for as long as the turn-signal lamp is set or a lane change has been determined.

Optionally, the output of the second signal is limited to a predetermined time duration. The signal transmitter can be designed for dispensing with or terminating the output of the second signal after the predetermined time duration in the event that the object has been detected. The output of the second signal can end after the predetermined time duration, for example when the object is still detected. The signal transmitter can be designed for beginning the output of the second signal in response to the detection of the object and, after the predetermined time duration has transpired, terminating the output in the event of a continued detection of the object.

After the predetermined time duration, the first signal can be output instead of the second signal, for example for as long as the turn-signal lamp is set or a lane change has been determined. If the at least one sensor detects a change in the object, for example a further approach by the object to the motor vehicle, the output of the second signal can be continued or started again.

Yet another aspect relates to a motor vehicle comprising a device for monitoring a blind spot zone of the motor vehicle according to one embodiment of the device aspect. At least one of the sensors can be situated on the side of the motor vehicle. The motor vehicle can be a commercial vehicle, in particular a truck, a tractor (for example, the truck in a truck-trailer combination or a semitrailer truck) or a bus (for example for city traffic, local transportation, or long-distance transportation). The at least one sensor can be mounted or mountable on a trailer or semitrailer, instead of on the motor vehicle, or in addition to at least one sensor on the motor vehicle.

Yet another aspect of the present disclosure relates to a method for the manufacture and/or configuration of a motor vehicle, in particular a commercial vehicle. The method includes the installation and/or configuration of a device for monitoring a blind spot zone of the motor vehicle according to the device aspect. The method can furthermore include steps of providing one or multiple features of the device aspect.

BRIEF DESCRIPTION OF THE FIGURES

The above-described, preferred embodiments and features of the present disclosure can be arbitrarily combined with each other. Further details and advantages of the present disclosure are described in the following with reference to the attached drawings. In the drawings:

FIG. 5 shows a schematic graphical representation of a second signal for the second exemplary embodiment of the device;

FIG. 6 shows a schematic side view of the motor vehicle during an exemplary detection of an object in the blind spot zone;

FIG. 7 shows a schematic representation of a signal transmitter in response to the detection of an object in the blind spot zone, for example in the situation from FIG. 6;

FIG. 9A shows a second implementation of the first signal for one of the exemplary embodiments of the device; and FIG. 9B shows a schematic graphical representation of the second signal which can be implemented in conjunction with the first signal from FIG. 9A.

DETAILED DESCRIPTION

Figure 1:
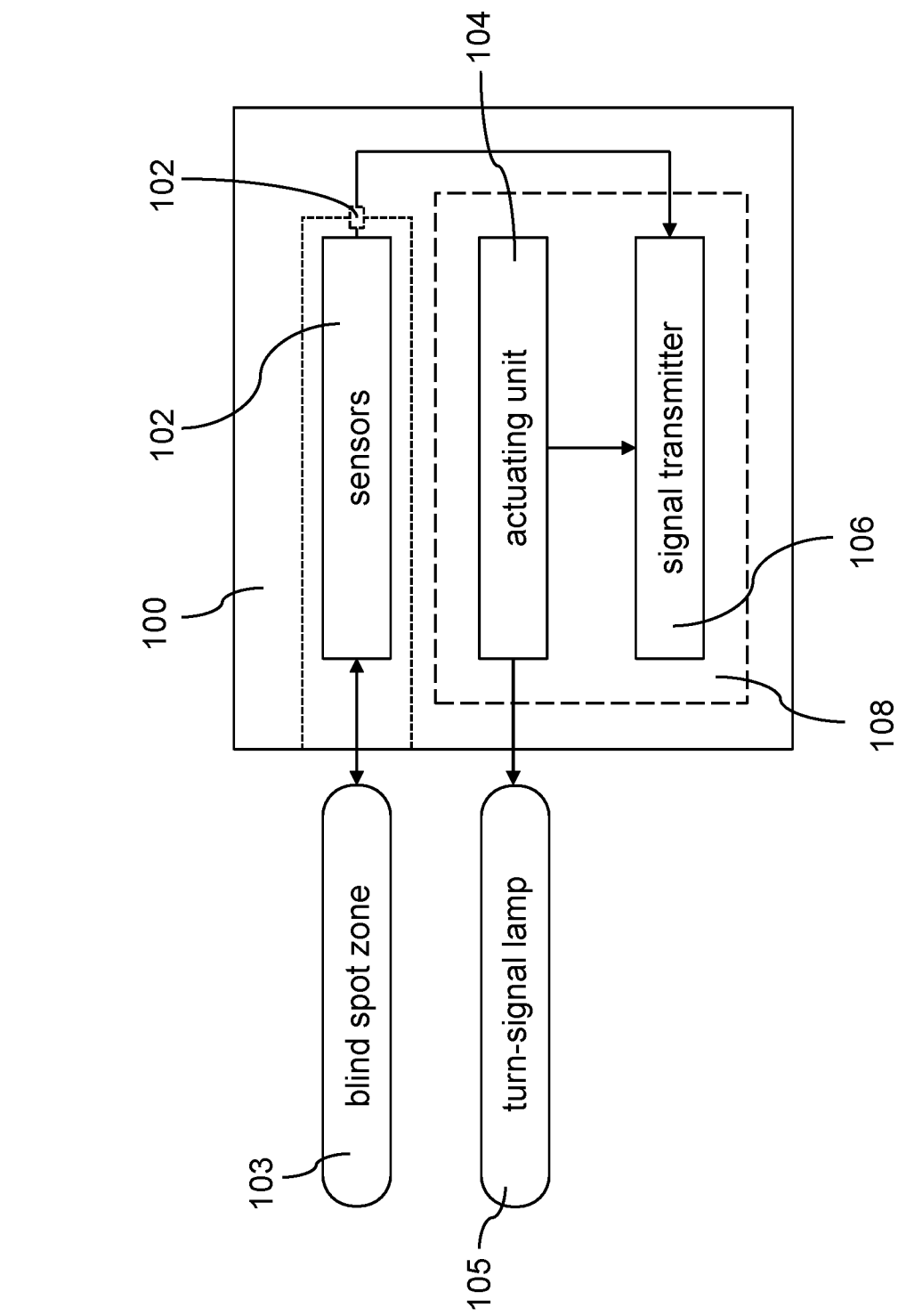
FIG. 1 shows a schematic block diagram of a first exemplary embodiment of a device for monitoring a blind spot zone of a motor vehicle.

FIG. 1 schematically shows a block diagram of a first exemplary embodiment of a device, which is designated in general using reference sign 100, for monitoring a blind spot zone of a motor vehicle. The device 100 includes at least one sensor 102 which is designed for detecting objects in the blind spot zone 103 of the motor vehicle. Furthermore, the device 100 includes an actuating unit 104, by means of which a turn-signal lamp 105 can be set; and a signal transmitter 106 which outputs a first signal for confirming the set turn-signal lamp when the turn-signal lamp 105 has been set. The signal transmitter 106 is further designed for outputting a second signal which is different from the first signal, if the at least one sensor 102 detects an object in the blind spot zone 103 of the motor vehicle. The first signal and the second signal utilize the same signal medium.

The signal transmitter 106 outputs the first and the second signals in the surroundings of the driver within the motor vehicle. To this end, the actuating unit 104 and the signal transmitter 106 are situated in a vehicle cab 108 of the motor vehicle, for example a driver's cab of a commercial vehicle. Both the first and the second signals can be an acoustic and/or a visual signal. The second signal may be the same as the first signal and has a higher repetition rate and/or a higher audio frequency (in the case of the acoustic signal), and/or a different color (for example, red instead of yellow in the case of a visual signal), and/or a higher signal intensity (for example a higher sound pressure level in the case of the acoustic signal).

The first signal can include both an acoustic signal as well as a visual signal. The second signal can include an acoustic signal derived from the acoustic part of the first signal. Alternatively or additionally, the second signal can include a visual signal derived from the visual part of the first signal. For example, the device 100 can be designed to be operated in two or more modes. In a first mode, the second signal is an acoustic signal, and in a second mode, the second signal is a visual signal. The device 100 can be further designed for switching the modes (for example, subsequently making adjustments), for example by way of one or multiple multi-function buttons on the steering wheel of the motor vehicle or by pressing a steering-column switch (for example in the longitudinal direction).

Alternatively or additionally, the device 100 can be designed for adjusting the intensity (for example, the volume) or the frequency (for example, the pitch) of the second signal (by means of the multi-function buttons or the steering-column switch).

In one exemplary implementation of the first exemplary embodiment, the driver is warned while making a lane change, in that the driver receives not only visual signals but also an acoustic, second signal which is integrated into the typical, familiar turn-indicator sound as the first signal for confirming the set turn-signal lamp 105, or which builds upon said sound. For example, both the first signal and the second signal are composed of one shared basic signal. The basic signal may be the ticking of a turn indicator. In the case of first signal, the basic signal is repeated at a first frequency, for example having a periodicity of 1.5 seconds. In the case of the second signal, the basic signal is repeated at a higher, second frequency, for example twice the frequency (corresponding to one-half the periodicity) of the first frequency.

The basic signal (for example, the ticking of the turn indicator) is a signal which each driver automatically associates with the intended lane-change process or turning process. The repetition frequency of the basic signal known to the driver is increased to the second frequency when an object (for example, another vehicle) is in the blind spot zone (i.e., in the danger zone which is monitored by the device 100). Due to this change, the automatic signal perception of the first signal (i.e., the basic signal having the familiar first frequency) by the driver is interrupted, and the driver can immediately associate the second signal, as a warning, with his/her error in the lane-change process or the turning process.

The ticking of the turn indicator is one example of an acoustic first signal. The above-described increase in a repetition frequency from a first frequency to a second frequency can also be applied, alternatively or additionally, to a visual first signal. For example, the second signal can include a more rapid flashing of a conventional turn-indicator signal lamp (as the signal transmitter 106 or part thereof). For this reason, a more detailed description of visual or other signals, which, alternatively or additionally, can be part of the first signal and the second signal, can be dispensed with.

In one implementation of the device 100, which is compatible with every exemplary embodiment, upon detection of an object in the blind spot zone 103, the second signal (for example, the turn-indicator ticking at the higher second frequency) is output for a short time (for example, 1 seconds to 3 seconds, e.g., approximately 2 seconds). This time duration is established by the motor vehicle manufacturer. Due to the decoupling of the time duration in which the second signal is output by the signal transmitter 106 from the time duration in which the object is detected in the blind spot zone 103, it is ensured that the driver does not rely solely on the device after a repeated, reliable detection of an object, i.e., he/she does not stop glancing into the rearview mirror and over his/her shoulder.

If a vehicle driver on a multi-lane road plans to change lanes, the vehicle driver must inform him or herself about vehicles in his/her surroundings and set the turn-signal lamp 105 by means of the actuating unit 104. If the driver estimates the situation to be such that a lane change is possible, in the normal case, the driver will set the turn-signal lamp 105 before the driver gradually departs from his/her lane.

Figure 2:
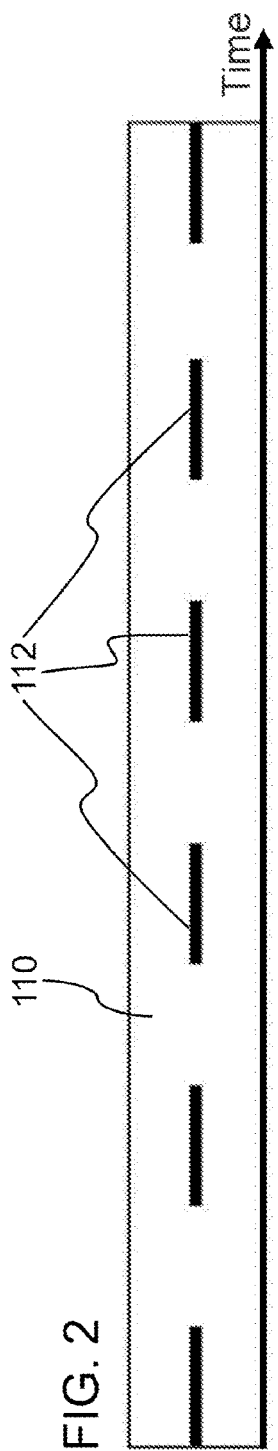
FIG. 2 shows a schematic graphical representation of a first signal for a second exemplary embodiment of the device for monitoring a blind spot zone.

FIG. 2 shows, in a schematic graphical representation, the first signal 110 output by the signal transmitter 106 having the turn-signal lamp 105 set, as a function of time. For example, the first signal 110 is composed of basic signals 112 periodically repeating at the first frequency.

Figure 3:
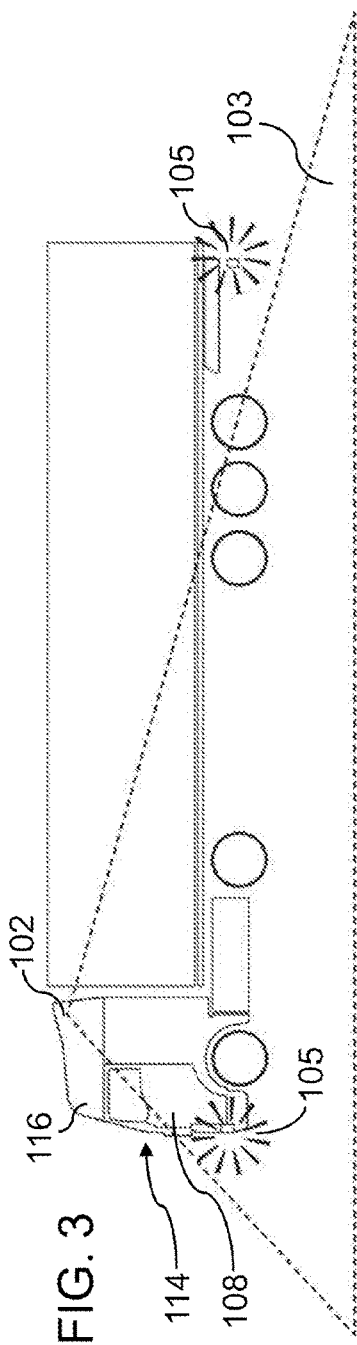
FIG. 3 shows a schematic side view of a motor vehicle in which one of the exemplary embodiments of the device can be implemented.

FIG. 3 shows, in a schematic side view, a commercial vehicle 114, for example a semitrailer truck. At least one of the sensors 102 is situated on the side of the vehicle 114, for example, on the roof 116 (for example on an air guide panel). Alternatively or in combination, at least one of the sensors 102 (for example, a radar sensor), is situated in the area of the vehicle frame of the motor vehicle. The sensor 102 detects the blind spot zone 103, for example by way of one or multiple radar beams. In the case of a semitrailer truck, the blind spot zone 103 can extend counter to the direction of travel, beyond the end of an attached semitrailer. As a result, the sensor 102 can also detect rapidly approaching vehicles at an early point in time.

For example, the radar sensor 102 detects the spacing from and speed of an approaching vehicle (relative to the motor vehicle 114, for example). Vehicles behind the end of the semitrailer are detected if the speed of the approaching vehicle is greater than the ground speed of the motor vehicle 114 and/or if a criterion depending on the spacing and the relative speed has been met.

In the situation schematically represented in FIG. 3, an object is not detected in the blind spot zone 103, and therefore the first signal 110 is output by the signal transmitter 106, within the vehicle cab 108 of the motor vehicle 114, due to the turn-signal lamp 105 having been set by means of the actuating device 104.

Figure 4:
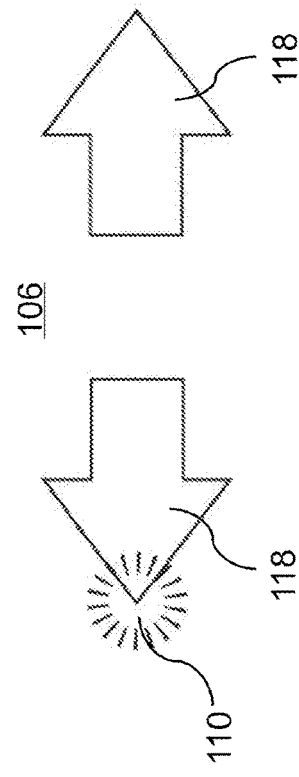
FIG. 4 schematically shows a signal transmitter for one of the exemplary embodiments of the device.

FIG. 4 schematically shows a first exemplary embodiment of a signal transmitter 106 which visually outputs the first signal 110 by means of graphical icons 118. The signal transmitter 106 is situated, at least with respect to a graphical or visual output, in an instrument cluster at the driver's seat in the vehicle cab 108 of the motor vehicle 114. Alternatively or additionally, the particular graphical icon 118 according to the direction which was input at the actuating unit 104 outputs a sound at the first frequency of the first signal 110.

If an object, for example another vehicle, is nevertheless located in the blind spot zone 103 of the motor vehicle 114 (i.e., in particular in the area of the desired lane), the familiar first signal 110 (for example, the familiar turn-indicator confirmation signal) changes visually and acoustically into the second signal 120, which is schematically represented in FIG. 5 as a function of time, when the lane is changed (which is detected, for example, on the basis of a correspondingly changed steering angle) and/or when the object is detected by means of the sensor 102. Optionally, the signal 120 is immediately output by the signal transmitter 106 (independently of a previous setting of the turn-signal lamp 105 by means of the actuating unit 104) upon detection of an object in the blind spot zone 103 by means of the sensor 102 and the detection of an intended lane change (for example, on the basis of a corresponding change in the steering angle).

The output of the second signal 120 may be limited to a predetermined time duration 122. After the time duration 122 has transpired and the object is still detected in the blind spot zone 103 by means of the sensor 102, the first signal 110 is output by the signal transmitter 106 again.

FIG. 6 schematically shows the side view of the motor vehicle 114, which is shown in FIG. 3, during the detection of an object 124 in the blind spot zone 103. A flashing signal of the turn-signal lamps 105 situated on the outer panel of the motor vehicle 114 (and, optionally, trailers electrically connected thereto) remains unchanged while the second signal is output by the signal transmitter 106 within the vehicle cab 108.

In the vehicle cab 108, the ticking (as the basic signal 112) of the turn indicator (as the turn-signal lamp 105) is increased from the first frequency to the second frequency for the time duration 122 (for example, for approximately 3 seconds) established by the manufacturer. The first signal 110 is also referred to as standard ticking. Both the acoustic standard ticking and the visual standard signal 110 for confirming the set turn signal 105 will assume the higher second frequency for the time duration 122 if the object 124 is detected in the blind spot zone 103 by the sensor 102. This change in the first signal 110 output by the signal transmitter 106 with respect to the second signal 120 draws the driver out of an automatic signal perception of the first signal 110, since the known basic signal 112 (for example, the ticking and the expected flashing of the corresponding graphical icon 118) increases starting from the familiar first frequency to the unfamiliar second frequency.

In this way, the second signal 120 is not only clearly noticeable over other signals. The second signal 120 is also unambiguously and quickly recognized as a warning message by the driver and is associated with the lane-change process or turning process, due to the same origin from the signal transmitter 106 and/or due to the shared basic signal 112.

The second signal 120 may end after the predetermined time duration 112 (for example, a time duration established by the manufacturer), so that the driver does not rely on the output of the second signal 120 for a long period of time (for example, due to the habituation effect) and "blindly" carries out a lane change. The second signal 120 therefore does not release one from personal responsibility during a lane change.

FIG. 7 schematically shows the visual partial aspect of the signal transmitter 106 during the detection of an object 124 in the blind spot zone 103 shown in FIG. 6.

Some or all the features of FIGS. 2 to 7 can be implemented in a second exemplary embodiment of the device 100. In this case, the first or the second signal schematically represented in FIGS. 2 and 5 can be acoustic and/or visual. Alternatively or additionally (in particular to the individual features of FIGS. 2 to 7), the second exemplary embodiment can be combined with the first exemplary embodiment. In this case, features described using identical reference signs can be combined or exchanged.

The second signal 120 is used as an (acoustic and/or visual) auxiliary signal for a lane-change assistance system of the device 100. The device 100 can output (for example, by means of the signal transmitter 106) further (visual and/or acoustic) auxiliary signals. Furthermore, the second signal 120 is acoustically and visually distinguished from the defect signal (by means of which the defect of a turn-signal lamp 105 of the motor vehicle 114 is signaled to the driver in the vehicle cab 108). For example, the signal transmitter 106 can output different messages on the basis of the uniform basic signal 112 in conjunction with different repetition frequencies and/or pitches. The messages can include: a confirmation signal according to the first signal 110 for confirming the set turn-signal lamp 105 (for example, the standard turn-indicator ticking), the warning about an object 124 in the blind spot zone 103 according to the second signal 120 (for example, the turn-signal ticking 112 at the increased second frequency for the short time duration 122), and the notification of a defect in the turn-signal lamp 105 (for example, in that the repetition frequency of the turn-signal ticking 112 is permanently changed as compared to the first signal 110).

Alternatively or additionally, in every exemplary embodiment, other signals of the same signal medium in the motor vehicle (for example, other acoustic signals, for example a radio, etc.) can be suppressed in order to improve the penetration (for example, acoustic or visual) of the second signal 120 (for example, as a warning sound) in this phase (for example, upon detection of the object). In order to suppress the other signals, the signal intensity of the other signals can be reduced or switched off (for example, mute or silent).

In one exemplary embodiment, the signal transmitter 106 includes the visual signal source, which is shown in FIG. 7, in the instrument cluster of a truck 114. In one realization of the situation shown in FIG. 6, the truck is located on a 3-lane highway. The driver of the truck would like to pass a van which is traveling head thereof at only 60 km/h. The truck driver confirms in the rearview mirror that there is no vehicle in the middle lane. The driver does not notice, however, that a car far behind on the horizon is approaching at a very high speed and is not responding to the lane change. The truck driver sets the turn-signal lamp 105 and immediately recognizes the danger, since the turn-indicator ticking according to the second signal 120 is ticking at a higher frequency than would be the case otherwise, according to the first signal 110. The driver also simultaneously notices the corresponding visual signal in the instrument cluster and decides to remain in the right-hand lane.

The device 100 can carry out auxiliary functions, for example when it has been forgotten to set the turn-signal lamp 105 and the driver nevertheless begins to change lanes or initiates the turning process. If the driver forgets to activate the turn indicator, the second signal 120 will be output even though the first signal 110 has not been previously output. In this case, the second signal 120, as the warning signal, also does not startle the driver, but rather makes him wonder, since the driver is confronted with the expected basic signal although in a modified version, thereby preventing a reflexive response. In this way, the driver is made aware of both errors (namely, having forgotten to activate the turn-signal lamp 105 and having overlooked the object 124 in the danger zone 103) in a sensible but direct manner.

The device 100 can be designed for further possible uses. The change in the repetition frequency according to the second signal 120 with respect to the first signal 110 can be utilized in any vehicle, in principle, which is operated in road traffic. The change in acoustic first and second signals can be combined with a change in other (for example, visual) signals.

If the driver forgets to activate the turn-signal lamp 105, other (in particular, acoustic) signals can be integrated into the first signal 110, as the second signal 120, or as part of the second signal 120, whereby the driver is made aware of the dangerous object 124. Alternatively or additionally, other assistance systems (for example, a lane-departure warning system having selective braking interventions at individual wheels of the motor vehicle 114) can be implemented in the device 100 or can be controlled by the device 100.

Within the motor vehicle 114, the direction from which the second signal 120 (for example, a sound source and/or light source) is output by the signal transmitter 106 can indicate the relative position with respect to the motor vehicle 114 or the vehicle side of the detected dangerous object 124 (for example, in the left-hand or right-hand lane).

Figure 8A:
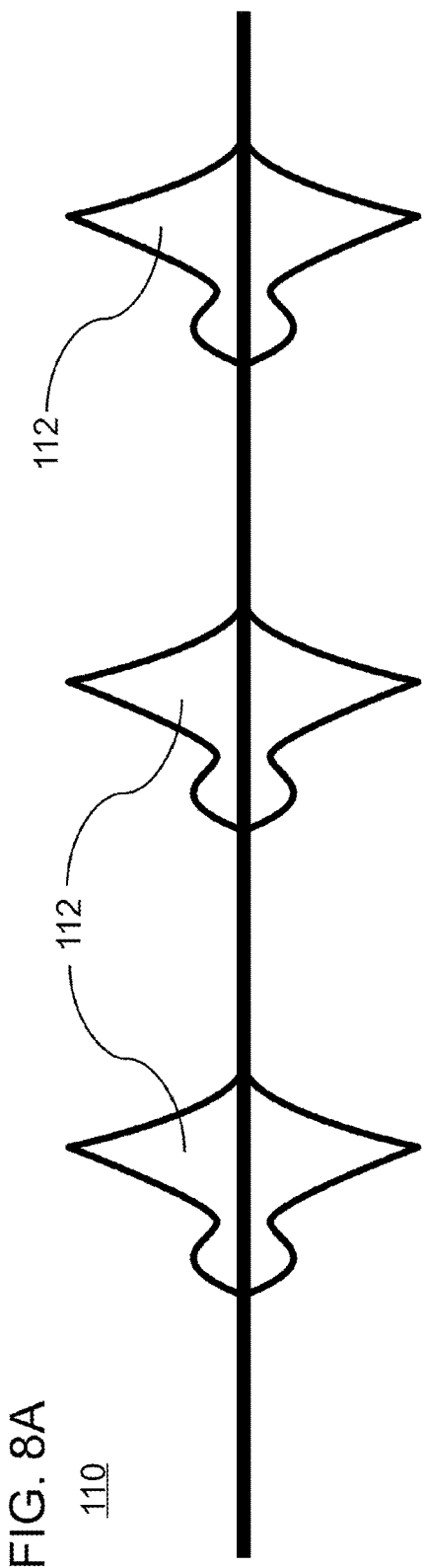
FIG. 8A shows a first implementation of the first signal for one of the exemplary embodiments of the device.
Figure 8B:
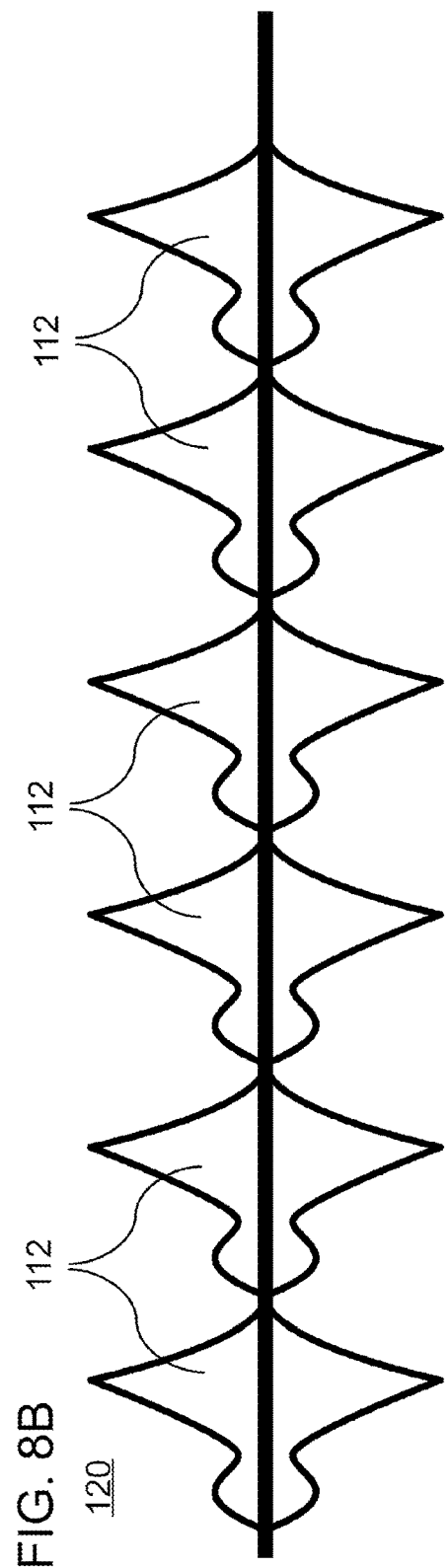
FIG. 8B shows a schematic graphical representation of the second signal which can be implemented in conjunction with the first signal from FIG. 8A.

FIG. 8A shows a first implementation of the first signal by means of envelopes of the signal amplitude in the time domain. The time is represented as increasing from left to right on the horizontal axis. The first signal 110 includes a periodic repetition of the basic signal 112. The second signal 120 for the first implementation is schematically represented in FIG. 8B. The basic signal, the time duration and pitch of which are unchanged, is output by the signal transmitter 106 at twice the repetition frequency in the second signal 120.

FIG. 9A schematically shows a second implementation of the first signal 110 on the basis of the basic signal 112. The signal transmitter 106 includes a digital-analog converter and a memory connected thereto, in which the basic signal 112 is stored as a voltage sequence having a certain sampling rate (for example, 48 kHz). The first signal 110 is output by the signal transmitter 106, in that the digital-analog converter outputs the stored basic signal 112, which is repeated at the first frequency, at an amplifier, for example an audio system in the vehicle cab 108.

In order to output the second signal 120, which is schematically represented in FIG. 9B, in a first variant, the signal transmitter 106 outputs the stored basic signal 112 at a higher sampling rate. For example, the digital-analog converter is operated at 96 kHz. Alternatively or in combination, the digital-analog converter is also operated at 48 kHz and only every second stored voltage value of the basic signal 112 or consecutive voltage values of the basic signal 112, which are averaged in pairs, is converted by the digital-analog converter.

In a further embodiment, the second signal 120 is generated in that the sequence of the stored voltage values for the basic signal 112 of the first signal 110 are changed in the frequency domain to a higher frequency, for example twice the frequency. To this end, the sequences of the stored voltage values are converted into the frequency domain via Fourier transformation, and the frequency components are shifted to the higher frequency and are converted into the time domain via inverse Fourier transformation. For example, to this end, a second sequence of voltage values is stored in the memory of the signal transmitter 106, and therefore the frequency conversion does not need to be carried out during the operation of the signal transmitter 106. The second variant offers the advantage over the first variant that the time duration of the individual basic signal 112 in the first signal 110 and in the second signal 120 can be independent of the frequency conversion. The time duration of a basic signal 112 in the first signal 110 and the time duration of a frequency-converted basic signal 112 in the second signal 120 are equally long.

Furthermore, the first implementation described with reference to FIGS. 8A and 8B and the second implementation of the signal transmitter 106 described with reference to FIGS. 9A and 9B can be combined with each other and/or can be combined with any of the aforementioned exemplary embodiments.

For example, the first signal 110 can include a first basic signal (for example, a "tick") 112 and a second basic signal (for example, a "tack"), which alternate at a fixed period. The second signal 120 can include the first basic signal 112 shifted to a higher frequency (for example, a high "tick") and the unchanged second basic signal (for example, a "tack"), which alternate at the same period as in the first signal 110. Alternatively or additionally, the second signal 120 can include the first basic signal (for example, a "tick") 112 and the second basic signal (for example, a "tack") having an unchanged pitch, which alternate at a shorter period (for example, one-half or one-fourth thereof) than the period of the first signal 110. Alternatively or additionally, the second signal 120 can include only the first basic signal (for example, a "tick") 112, for example having a repetition rate which is greater than the repetition rate in the first signal 110 (i.e., greater than the inverse period of the first signal 110). Alternatively or additionally, the second signal 120 can include the unchanged first basic signal (for example, a high "tick") and the second basic signal shifted to a lower frequency (for example, a low "tack"), which alternate at the same period as in the first signal 110.

On the basis of the exemplary embodiments presented above, it is apparent to a person skilled in the art that the technique makes it possible, instead of acoustic or visual signals which are similar to the messages from other assistance systems, to establish a clear correlation between the warning of the second signal and the first signal which is expected during a lane change. The risk of a "numbing" occurring due to the large number of acoustic signals as in conventional lane-change assistance systems, or the risk of mistaking, misinterpreting, or not hearing a warning message can thus be reduced. For example, the second signal is brought into connection with the familiar confirmation signal of the turn-signal lamp 105, as the first signal (for example, a turn-indicator ticking) and can then be immediately assigned to the lane-change process to the turning process.

The technique can establish an unambiguous correlation between the first signal generated by the same signal transmitter for the same signal medium as the confirmation signal of the turn-signal lamp, and the second signal as a warning signal, without the first signal and the second signal being confused, for example on the basis of the two-fold repetition frequency. The driver is made aware of the danger by way of the second signal being output for a predetermined time duration (for example, for approximately 3 seconds) as a temporary increase in the repetition frequency (for example, a more rapid flashing) as compared to the first signal (for example, the flashing of the conventional turn indicator signal lamp).

The use of the same basic signal in the second signal can also generate a warning signal that does not startle the driver in a situation requiring concentration (such as a lane change) and result in reflexive, dangerous steering movements. On the contrary, in the case of conventional lane-change assistance systems having a sudden warning signal that is intended to alert the driver to his error during the lane change carried out in deep concentration, there is the risk that the driver will be startled and, as a reflexive response, will abruptly pull the steering wheel to the side, for example. The technique makes it possible to change the first signal, which has already been triggered, to the second signal, and therefore the driver is alerted to the dangerous situation in a way that cannot be misunderstood, by means of signal continuity.

Although the present disclosure has been described with reference to exemplary embodiments, it is apparent to a person skilled in the art that various changes can be made and equivalents can be used as a substitute. Furthermore, several modifications can be implemented in order to adapt a certain situation or a certain vehicle model to the teaching of the present disclosure. Consequently, the present disclosure is not limited to the disclosed exemplary embodiments, but rather includes all exemplary embodiments which fall within the scope of the attached claims.

LIST OF REFERENCE SIGNS

100 device for monitoring a blind spot zone
102 sensor for monitoring the blind spot zone
102' sensor interface
103 blind spot zone
104 actuating unit
105 turn-signal lamp
106 signal transmitter
108 vehicle cab
110 first signal
112 basic signal
114 motor vehicle
116 roof
118 graphical icon
120 second signal
122 time duration
124 detected object

We claim:

1. A device for monitoring a blind spot zone of a motor vehicle, comprising:
   at least one sensor or an interface of at least one sensor, which is designed for detecting objects in the blind spot zone of the motor vehicle;
   an actuating unit which is designed for setting a turn-signal lamp; and
   a signal transmitter which is designed for outputting, in the motor vehicle, a first signal for confirming the set turn-signal lamp, and outputting a second signal, which differs from the first signal, from the same signal medium as the first signal, if the at least one sensor detects an object in the blind spot zone of the motor vehicle, wherein both the first signal and the second signal include an audio signal within the motor vehicle, the first signal and the second signal being signal sequences having a shared basic signal.

2. The device according to claim 1, wherein the signal transmitter is designed for continuously outputting either the first signal or the second signal when the turn-signal lamp has been set.

3. The device according to claim 1, wherein the signal transmitter is designed for outputting the first signal and the second signal at the same point within the motor vehicle.

4. The device according to claim 1, wherein both the first signal and the second signal includes a visual signal within the motor vehicle.

5. The device according to claim 1, wherein the first signal and the second signal include repetitions of the basic signal.

6. The device according to claim 5, wherein the repetition of the basic signal in the first signal has a greater periodicity than the repetition of the basic signal in the second signal.

7. The device according to claim 1, wherein the basic signal includes an audio signal, and the audio signal in the second signal is shifted to a higher frequency relative to the audio signal in the first signal.

8. The device according to claim 1, wherein the signal transmitter is designed for outputting the first signal when the turn-signal lamp has been set and an object has not been detected in the blind spot zone.

9. The device according to claim 1, wherein the signal transmitter is designed for outputting the second signal, in the event that the object has been detected, when a lane change by the motor vehicle has been determined.

10. The device according to claim 9, wherein the lane change is determined on the basis of the set turn-signal lamp, a steering angle of the motor vehicle, or a position of the motor vehicle relative to optically detected road markings.

11. The device according to claim 1, wherein the signal transmitter is designed for terminating the output of the second signal after a predetermined time duration in the event that the object has been detected.

12. The device according to claim 11, wherein the signal transmitter is designed for beginning the output of the second signal in response to the detection of the object and, after the predetermined time duration has transpired, terminating the output in the event of a continued detection of the object.

13. A motor vehicle, in particular commercial vehicle, comprising:
- a device for monitoring a blind spot zone of a motor vehicle, the device including,
  - at least one sensor or an interface of at least one sensor, which is designed for detecting objects in the blind spot zone of the motor vehicle;
  - an actuating unit which is designed for setting a turn-signal lamp; and
  - a signal transmitter which is designed for outputting, in the motor vehicle, a first signal for confirming the set turn-signal lamp, and outputting a second signal, which differs from the first signal, from the same signal medium as the first signal, if the at least one sensor detects an object in the blind spot zone of the motor vehicle, wherein both the first signal and the second signal include an audio signal within the motor vehicle, the first signal and the second signal being signal sequences having a shared basic signal.

14. The motor vehicle according to claim 13, wherein at least one of the sensors is situated on the side of the motor vehicle.

\* \* \* \* \*